Sept. 15, 1936.  L. GOLDENBERG  2,054,598
CREEPER
Filed Nov. 9, 1934
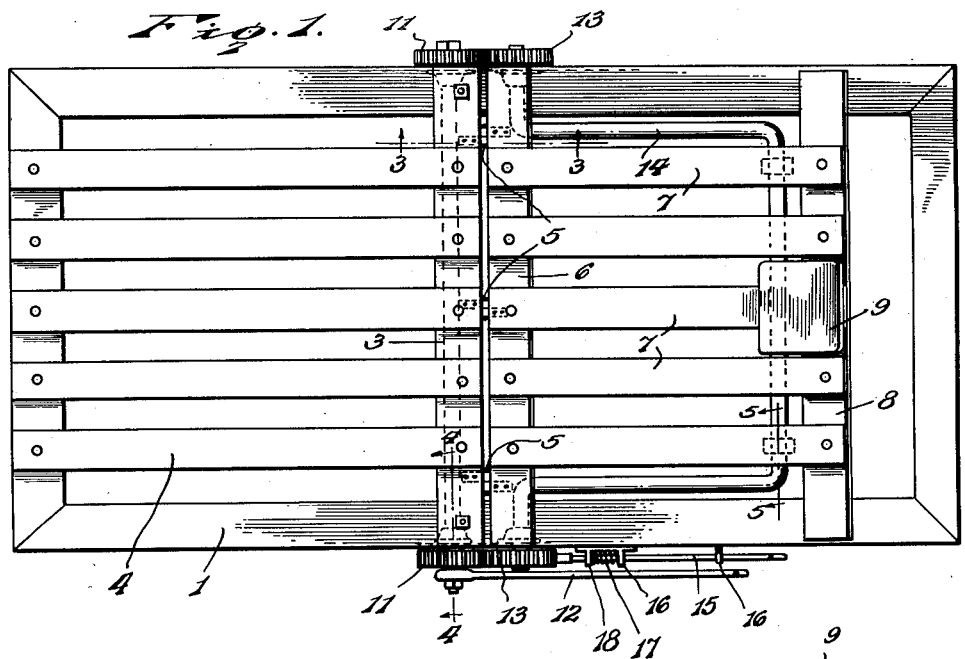
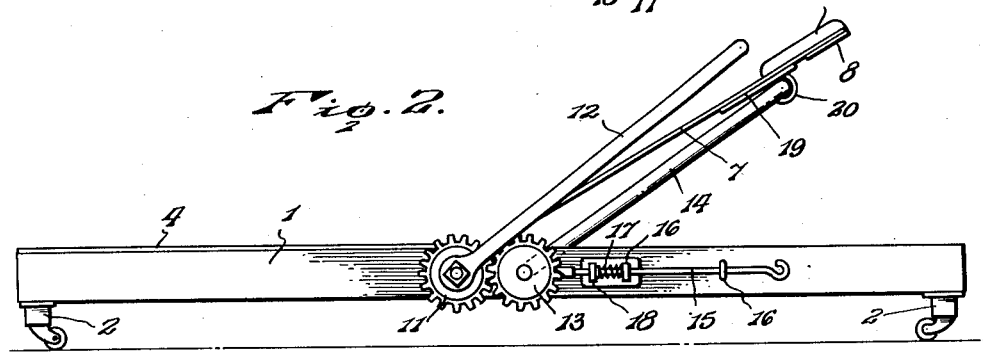
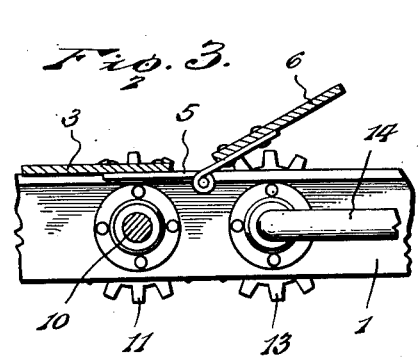
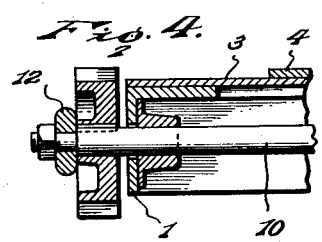
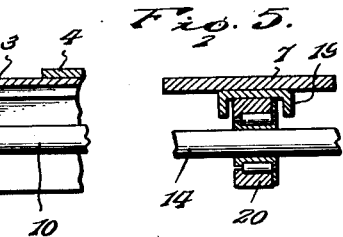
Inventor
Leon Goldenberg.
By Lacey & Lacey, Attorneys Patented Sept. 15, 1936

2,054,598

UNITED STATES PATENT OFFICE 2,054,598

CREEPER

Leon Goldenberg, Shreveport, La.

Application November 9, 1934, Serial No. 752,348

1 Claim. (Cl. 280—61.5)

This invention relates to creepers for the use of automobile mechanics when they desire to work beneath an automobile. The present invention has for its object the provision of a light but strong and durable creeper which may be easily moved about by an operator reclining thereon and in which there will be provided a novel comfortable headrest easily adjusted to any desired position. The invention is illustrated in the accompanying drawing and consists in certain novel features which will be hereinafter fully described and then particularly defined in the appended claim.

In the drawing:

Figure 1 is a plan view of a creeper embodying the present invention.

Figure 2 is a side elevation of the same.

Figure 3 is an enlarged detail section on the line 3—3 of Figure 1.

Figure 4 is an enlarged detail section on the line 4—4 of Figure 1.

Figure 5 is an enlarged detail section on the line 5—5 of Figure 1.

In constructing a creeper according to the present invention, there is provided a rectangular frame 1, at each corner of which is mounted a caster 2 whereby the creeper may be easily moved about as desired. Secured upon and extending transversely of the frame at about the center of the same is a plate or cross bar 3 and extending between said cross bar and an end of the frame are slats 4 which are secured at their ends to the frame and said bar, as will be understood upon reference to Figure 1. Hinges 5 are secured to the cross bar or plate 3 and to a similar cross bar 6 which is disposed parallel with the bar 3 but is not secured upon the frame. To the cross bar 6 are secured slats 7 which are similar to the slats 4 and are alined respectively therewith, the free ends of these slats 7 being secured to a third cross bar 8, as shown in Figure 1, and said slats 7 and cross bars 6 and 8 constituting a headrest. A pillow 9 of any approved form is secured upon the headrest at the center of its upper or free side so that a comfortable rest will be provided for the mechanic's head.

Extending through the sides of the frame, immediately below the cross bar 3, is a shaft 10 upon the ends of which are secured gears 11 and upon one end of the shaft is secured an operating lever 12 whereby the shaft may be rotated or rocked to effect adjustment of the headrest as desired. The lever is relatively long and is adapted to swing in a vertical plane longitudinally of the frame so that operation, by a reclining person, will be facilitated. The gears 11 mesh with gears 13 secured upon the ends of a U-shaped frame 14 which is disposed below the headrest and has its ends turned outwardly and journaled in the sides of the frame to be secured in the gears, as will be understood. A latch 15 is mounted upon one side of the frame to engage the gear 13 and thereby hold the gears and the headrest in any position in which they may be set. This latch, as shown clearly in Figure 2, consists of a rod slidably mounted in suitable guides 16 on the side of the frame and held yieldably in engagement with the adjacent gear by a spring 17 which is coiled around the rod between the inner guide 16 and an abutment 18 on the rod in an obvious manner.

On the under sides of some slats 7 are secured tracks consisting of channels 19, and immediately below said tracks, rollers 20 are mounted upon the frame 14 to run on said tracks and thereby reduce frictional wear upon the parts in the adjustment of the headrest.

From the foregoing description, taken in connection with the accompanying drawing, it will be seen that I have provided a very simple device which may be produced at a low cost and which will constitute an efficient accessory for automobile mechanics. The workman reclines upon the bed consisting of the slats 4 and 7 and may easily adjust the headrest to suit his own convenience and comfort. Movement of the lever 12 in one direction will cause the frame 14 to swing upwardly and thereby elevate the headrest, while movement of the lever in the opposite direction will, of course, cause the frame to rock downwardly and permit the headrest to be lowered. The latch 15 will, of course, be disengaged from the gears when the headrest is being adjusted and when the desired position of the headrest has been attained, release of the latch will permit it to at once reengage the gears and hold the parts in the set position.

When the device is not in use the lever may be swung toward the foot of the device so as to lie alongside the frame between the top and bottom of the same and this movement will bring the frame 14 within the lines of the main frame with the headrest down on the top of the main frame. The device will then occupy but very little space so that it will not impede the movements of other workmen or interfere with operations in any way. It may also be noted that the slats 3 and 7 are relatively thin and will, therefore, possess some resiliency so that they will not tend to produce fatigue in the body or limbs of the workmen.

Having thus described the invention, what is claimed as new is:

A creeper comprising a portable main frame, a cross bar secured on the main frame at about the center thereof, slats extending longitudinally of the main frame and secured thereto and to said cross bar, a second cross bar parallel with the first cross bar, hinges connecting the two cross bars, slats secured to the second cross bar and extending therefrom, a third cross bar connecting the remote ends of the last-mentioned slats, a pillow secured on the last-mentioned slats over said third cross bar, a U-shaped frame disposed below and engaging the under side of the last-mentioned slats and having its ends journaled in the main frame, an adjusting shaft journaled in the main frame below the first-mentioned cross bar, gearing connecting said shaft with the ends of the U-shaped frame, means for actuating said gearing whereby to adjust the headrest-supporting frame, and means for locking said gearing to hold the headrest in a set position.

LEON GOLDENBERG.